(12) United States Patent
Zeng et al.

(10) Patent No.: US 9,427,736 B2
(45) Date of Patent: Aug. 30, 2016

(54) SYSTEM AND METHOD FOR MICROFLUIDIC FLOW CONTROL

(71) Applicant: Canon U.S. Life Sciences, Inc., Rockville, MD (US)

(72) Inventors: Shulin Zeng, Gaithersburg, MD (US); Gregory A. Dale, Gaithersburg, MD (US)

(73) Assignee: Canon U.S. Life Sciences, Inc., Rockville, MD (US)

(*) Notice: Subject to any disclaimer, the term of this patent is extended or adjusted under 35 U.S.C. 154(b) by 0 days.

(21) Appl. No.: 14/606,392

(22) Filed: Jan. 27, 2015

(65) Prior Publication Data
US 2015/0298122 A1 Oct. 22, 2015

Related U.S. Application Data

(63) Continuation of application No. 13/397,272, filed on Feb. 15, 2012, now Pat. No. 8,939,171, which is a continuation of application No. 12/164,992, filed on Jun. 30, 2008, now Pat. No. 8,122,901.

(51) Int. Cl.
*F16K 11/20* (2006.01)
*F17D 1/00* (2006.01)
(Continued)

(52) U.S. Cl.
CPC ...... *B01L 3/50273* (2013.01); *B01L 3/502738* (2013.01); *F16K 99/0001* (2013.01); *B01L 2200/0605* (2013.01); *B01L 2200/10* (2013.01);
(Continued)

(58) Field of Classification Search
CPC .......... F16K 99/0028; F16K 2099/0086; F16K 99/0001; B01L 3/502738; B01L 2300/0861
USPC ................................. 137/597, 565.23
See application file for complete search history.

(56) References Cited

U.S. PATENT DOCUMENTS 5,726,404 A 3/1998 Brody
5,794,641 A * 8/1998 Pan .................. F15C 3/04
137/1

(Continued)

FOREIGN PATENT DOCUMENTS

JP 2001-503681 A 3/2001
JP 2007-511744 A 5/2007
WO 03065976 A2 8/2003

OTHER PUBLICATIONS

Supplementary European search report for corresponding European patent application No. 09774248.0-2113/2297470 mailed Nov. 8, 2011.
(Continued)

*Primary Examiner* — Kevin Lee
(74) *Attorney, Agent, or Firm* — Rothwell, Figg, Ernst & Manbeck, P.C.

(57) ABSTRACT

A system and method for controlling fluid flow within a microchannel includes a fluid circuit comprising a fluid outlet well and one or more fluid inlet wells, all in communication with a microchannel. A negative pressure differential is applied to the outlet well and fluid flow from an inlet well into the microchannel is controlled by opening or closing the inlet well to atmospheric pressure. To stop fluid flow from the inlet well, a negative pressure differential may be applied to the inlet well to equalize pressure between the inlet and outlet wells. By sequentially opening and closing different inlet wells to atmosphere, controlled amounts of different reagents can be serially introduced into the microchannel.

10 Claims, 6 Drawing Sheets

(51) Int. Cl.
  *B01L 3/00*   (2006.01)
  *F16K 99/00*  (2006.01)

(52) U.S. Cl.
  CPC . *B01L 2300/0861* (2013.01); *B01L 2300/0867* (2013.01); *B01L 2300/12* (2013.01); *B01L 2300/14* (2013.01); *B01L 2400/049* (2013.01); *B01L 2400/0666* (2013.01); *F16K 2099/0084* (2013.01); *F16K 2099/0086* (2013.01); *Y10T 137/0396* (2015.04); *Y10T 137/2191* (2015.04); *Y10T 137/86083* (2015.04); *Y10T 137/87249* (2015.04)

(56) References Cited

U.S. PATENT DOCUMENTS

| | | | |
|---|---|---|---|
| 5,880,071 | A | 3/1999 | Parce et al. |
| 6,070,607 | A | 6/2000 | Casey |
| 6,293,012 | B1 | 9/2001 | Moles |
| 6,416,642 | B1 | 7/2002 | Alajoki et al. |
| 6,450,203 | B1 | 9/2002 | Backhouse et al. |
| 6,488,895 | B1 | 12/2002 | Kennedy |
| 6,561,208 | B1 | 5/2003 | O'Connor et al. |
| 6,589,791 | B1 | 7/2003 | LaBudde et al. |
| 6,615,856 | B2 | 9/2003 | McNeely et al. |
| 6,619,311 | B2 | 9/2003 | O'Connor et al. |
| 6,662,818 | B2 | 12/2003 | Paul et al. |
| 6,767,706 | B2 | 7/2004 | Quake et al. |
| 6,779,559 | B2 | 8/2004 | Parce et al. |
| 6,802,342 | B2 | 10/2004 | Fernandes et al. |
| 6,848,462 | B2 | 2/2005 | Covington et al. |
| 6,877,528 | B2 | 4/2005 | Gilbert et al. |
| 6,915,679 | B2 | 7/2005 | Chien et al. |
| 6,953,058 | B2 | 10/2005 | Fernandes et al. |
| 7,001,853 | B1 | 2/2006 | Brown et al. |
| 7,105,304 | B1 | 9/2006 | Nikiforov et al. |
| 7,214,298 | B2 | 5/2007 | Spence et al. |
| 7,258,774 | B2 | 8/2007 | Chou et al. |
| 7,294,503 | B2 | 11/2007 | Quake et al. |
| 7,832,429 | B2 | 11/2010 | Young et al. |
| 8,071,057 | B2 * | 12/2011 | Tokita ............... B01J 19/0093 422/417 |
| 8,122,901 | B2 | 2/2012 | Zeng et al. |
| 8,286,665 | B2 | 10/2012 | Mathies et al. |
| 2002/0153047 | A1 | 10/2002 | Parce et al. |
| 2003/0008308 | A1 | 1/2003 | Enzelberger et al. |
| 2003/0106596 | A1 | 6/2003 | Yang et al. |
| 2003/0196695 | A1 | 10/2003 | O'Connor et al. |
| 2006/0246533 | A1 | 11/2006 | Fathollahi et al. |
| 2006/0275179 | A1 | 12/2006 | Viovy et al. |
| 2007/0068573 | A1 | 3/2007 | Cox et al. |
| 2007/0074972 | A1 | 4/2007 | Nassef et al. |
| 2007/0157973 | A1 | 7/2007 | Chien et al. |
| 2007/0166199 | A1 | 7/2007 | Zhou et al. |

OTHER PUBLICATIONS

PCT International Search Report and Written Opinion, issued in PCT/US2009/49073 on Aug. 7, 2009, 8 pages.

* cited by examiner

SYSTEM AND METHOD FOR MICROFLUIDIC FLOW CONTROL

CROSS REFERENCE TO RELATED APPLICATIONS

This application is a continuation of application Ser. No. 13/397,272, filed Feb. 15, 2012 now U.S. Pat. No. 8,939,171, which is a continuation of application Ser. No. 12/164,992, filed Jun. 30, 2008, now U.S. Pat. No. 8,122,901, issued Feb. 28, 2012, which are incorporated herein by reference in their entireties.

BACKGROUND

1. Field of the Invention

This invention relates to systems and methods for performing microfluidic assays. More specifically, the invention relates to systems and methods for controlling flow through a microchannel.

2. Discussion of the Background

The detection of nucleic acids is central to medicine, forensic science, industrial processing, crop and animal breeding, and many other fields. The ability to detect disease conditions (e.g., cancer), infectious organisms (e.g., HIV), genetic lineage, genetic markers, and the like, is ubiquitous technology for disease diagnosis and prognosis, marker assisted selection, correct identification of crime scene features, the ability to propagate industrial organisms and many other techniques. Determination of the integrity of a nucleic acid of interest can be relevant to the pathology of an infection or cancer. One of the most powerful and basic technologies to detect small quantities of nucleic acids is to replicate some or all of a nucleic acid sequence many times, and then analyze the amplification products. Polymerase chain reaction ("PCR") is perhaps the most well known of a number of different amplification techniques.

PCR is a powerful technique for amplifying short sections of DNA. With PCR, one can quickly produce millions of copies of DNA starting from a single template DNA molecule. PCR includes a three phase temperature cycle of denaturation of DNA into single strands, annealing of primers to the denatured strands, and extension of the primers by a thermostable DNA polymerase enzyme. This cycle is repeated so that there are enough copies to be detected and analyzed. In principle, each cycle of PCR could double the number of copies. In practice, the multiplication achieved after each cycle is always less than 2. Furthermore, as PCR cycling continues, the buildup of amplified DNA products eventually ceases as the concentrations of required reactants diminish. For general details concerning PCR, see Sambrook and Russell, *Molecular Cloning—A Laboratory Manual* (3rd Ed.), Vols. 1-3, Cold Spring Harbor Laboratory, Cold Spring Harbor, N.Y. (2000); *Current Protocols in Molecular Biology*, F. M. Ausubel et al., eds., Current Protocols, a joint venture between Greene Publishing Associates, Inc. and John Wiley & Sons, Inc., (supplemented through 2005) and *PCR Protocols A Guide to Methods and Applications*, M. A. Innis et al., eds., Academic Press Inc. San Diego, Calif. (1990).

Real-time PCR refers to a growing set of techniques in which one measures the buildup of amplified DNA products as the reaction progresses, typically once per PCR cycle. Monitoring the accumulation of products over time allows one to determine the efficiency of the reaction, as well as to estimate the initial concentration of DNA template molecules. For general details concerning real-time PCR see *Real-Time PCR: An Essential Guide*, K. Edwards et al., eds., Horizon Bioscience, Norwich, U.K. (2004).

Several different real-time detection chemistries now exist to indicate the presence of amplified DNA. Most of these depend upon fluorescence indicators that change properties as a result of the PCR process. Among these detection chemistries are DNA binding dyes (such as SYBR® Green) that increase fluorescence efficiency upon binding to double stranded DNA. Other real-time detection chemistries utilize Foerster resonance energy transfer (FRET), a phenomenon by which the fluorescence efficiency of a dye is strongly dependent on its proximity to another light absorbing moiety or quencher. These dyes and quenchers are typically attached to a DNA sequence-specific probe or primer. Among the FRET-based detection chemistries are hydrolysis probes and conformation probes. Hydrolysis probes (such as the TaqMan® probe) use the polymerase enzyme to cleave a reporter dye molecule from a quencher dye molecule attached to an oligonucleotide probe. Conformation probes (such as molecular beacons) utilize a dye attached to an oligonucleotide, whose fluorescence emission changes upon the conformational change of the oligonucleotide hybridizing to the target DNA.

Commonly-assigned, co-pending U.S. application Ser. No. 11/505,358, entitled "Real-Time PCR in Micro-Channels," the disclosure of which is hereby incorporated by reference, describes a process for performing PCR within discrete droplets flowing through a micro-channel and separated from one another by droplets of non-reacting fluids, such as buffer solution, known as flow markers.

Devices for performing in-line assays, such as PCR, within microchannels include microfluidic chips having one or more microchannels formed within the chip are known in the art. These chips utilize a sample sipper tube and open ports on the chip topside to receive and deliver reagents and sample material (e.g., DNA) to the microchannels within the chip. The chip platform is designed to receive reagents at the open ports—typically dispensed by a pipetter—on the chip top, and reagent flows from the open port into the microchannels, typically under the influence of a vacuum applied at an opposite end of each microchannel. The DNA sample is supplied to the microchannel from the ports of a microport plate via the sipper tube, which extends below the chip and through which sample material is drawn from the ports due to the vacuum applied to the microchannel.

In some applications, it is desirable that fluids from all of the top-side open ports flow into the microchannel, and, in other applications, it will be desirable that fluid flow from one or more, but less than all, of the top-side open ports. Also, to introduce different reagents into the microchannel via a sipper tube—typically extending down below the microchip—it is necessary to move the sipper tube from reagent container to reagent container in a sequence corresponding to the desired sequence for introducing the reagents into the microchannel. This requires that the processing instrument for performing in-line assays within the microfluidic channel of a microchip include means for effecting relative movement between the sipper tube and the different reagent containers. In addition, sipper tubes, which project laterally from a microchannel, are extremely fragile, thereby necessitating special handling, packaging, and shipping.

SUMMARY

Aspects of the invention are embodied in a method of controlling fluid flow within a microfluidic circuit including an inlet port through which fluid is introduced into the circuit, at least one microchannel for fluid flow in fluid communication with the inlet port, and an outlet port in fluid communication with the microchannel. The method comprises causing fluid flow from the inlet port into the microchannel by applying a first pressure to the outlet port and opening the inlet port to a second pressure higher than the first pressure, such as atmospheric pressure, and then stopping the fluid flow from the inlet port by closing the inlet port to the second pressure and applying the first pressure to the inlet port.

Further aspects of the invention are embodied in a system for controlling microfluidic flow. The system comprises a microfluidic circuit including at least one inlet port through which fluid is introduced into the circuit, at least one microchannel for microfluidic flow in fluid communication with the inlet port, and an outlet port in fluid communication with the microchannel. The system further includes at least one pressure source in communication with the outlet port and a valve mechanism operatively associated with each inlet port and in communication with the pressure source. The valve mechanism is adapted to selectively connect the inlet port (1) to a first pressure generated by the pressure source or (2) to a second pressure higher than the first pressure.

According to further aspects of the invention, the system includes a controller adapted to cause the pressure source to apply the first pressure to the outlet port and to cause the valve mechanism to open the inlet port to the second pressure to cause fluid to flow from the inlet port into the microchannel. After the inlet port has been open to the second pressure for a predetermined period of time, the controller causes the valve mechanism to close the inlet port to the second pressure and open the inlet port to the pressure source to stop flow from the inlet port into the microchannel.

Further aspects of the invention are embodied in a method for sequentially introducing predetermined amounts of different reaction fluids into a microchannel. The method comprises the steps of providing a microfluidic circuit including a microchannel, a plurality of inlet ports in fluid communication with the microchannel and through which different reaction fluids are introduced into the microchannel, and an outlet port in fluid communication with the microchannel. A negative pressure differential is applied to the outlet port, and a predetermined amount of reaction fluid is sequentially introduced into the microchannel from each of the inlet ports by sequentially opening each inlet port to higher pressure for a predetermined period of time while the other inlet ports are closed to cause a predetermined amount of fluid to flow from that inlet port into the microchannel, and, after the predetermined period of time, stopping fluid flow from that inlet port by closing that inlet port to the higher pressure and applying the negative pressure differential to that inlet port for period of time to equalize the pressure between the inlet port and the inlet of the microchannel, and then shutting off the valve to the inlet port.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF THE PREFERRED EMDODIMENT

As used herein, the words "a" and "an" mean "one or more." Furthermore, unless defined otherwise, all technical and scientific terms used herein have the same meaning as commonly understood by one of ordinary skill in the art to which the invention pertains. Although any methods and materials similar or equivalent to those described herein can be used in the practice of the present invention, the preferred materials and methods are described herein.

Figure 1:
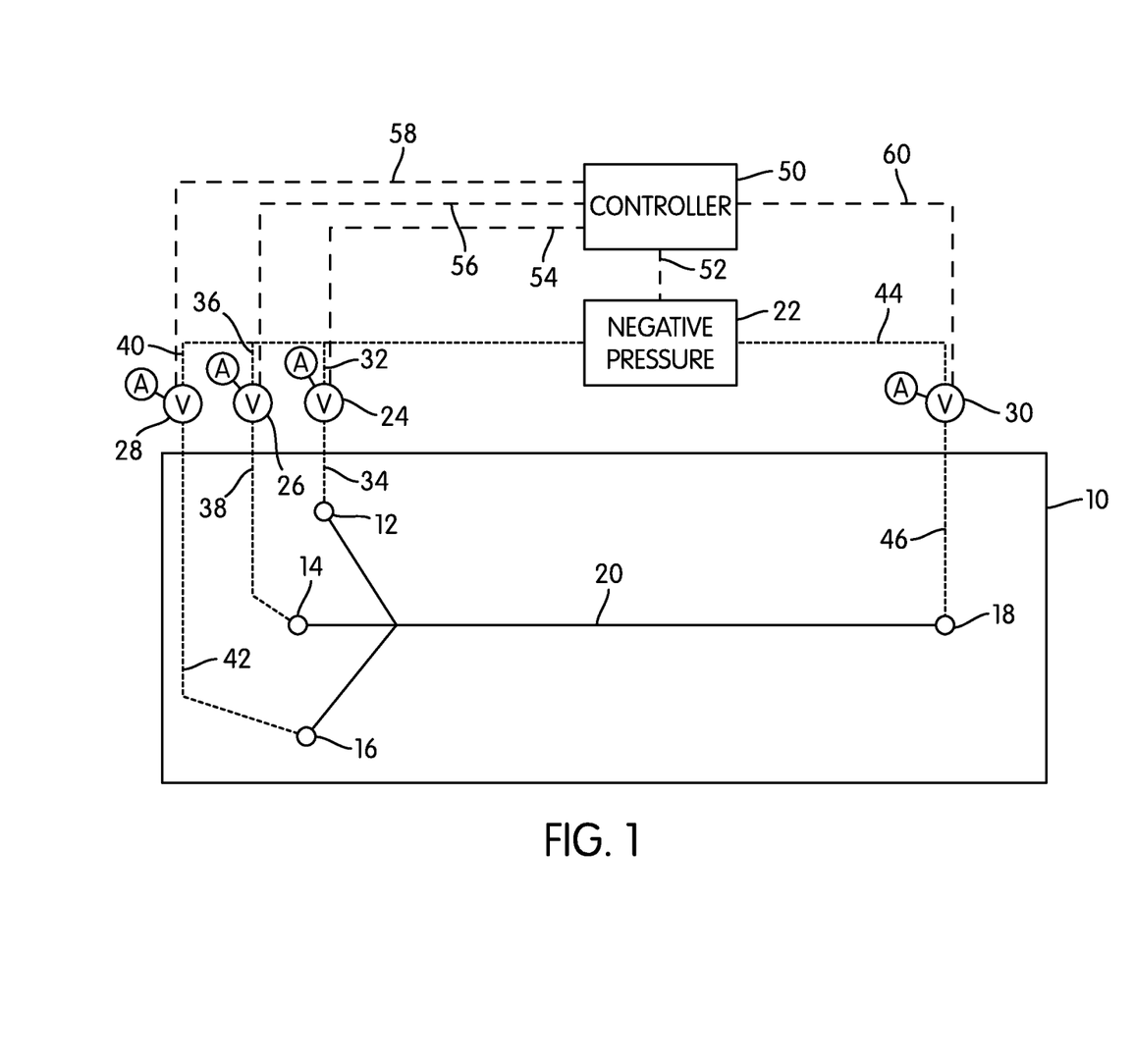
FIG. 1 is a schematic view of a microfluidic chip and flow control system embodying aspects of the present invention.

A system for microfluidic flow embodying aspects of the present invention is shown in FIG. 1. The system includes a microfluidic circuit which, in the illustrated embodiment, is carried on a microfluidic chip 10. Microfluidic chip 10 includes inlet ports 12, 14, 16, a microchannel 20 that is in fluid communication with the inlet ports 12, 14, 16, and an outlet port 18 also in fluid communication with the microchannel 20. The embodiment shown in FIG. 1 is exemplary; the microfluidic circuit may include more or less than three inlet ports and may include more than one microchannel in communication with some or all of the inlet ports. The microfluidic circuit may also include more than one outlet port. Fluid is introduced into the circuit through the fluid inlet ports 12, 14, and 16. Fluid may be provided to the fluid inlet ports in any appropriate manner known in the art. Or, alternatively, fluid may be provided to the fluid inlet ports by means of a fluid-containing cartridge coupled to each port in a fluid-communicating manner as described in commonly assigned U.S. patent application Ser. No. 11/850,229 "Chip and cartridge design configuration for performing microfluidic assays", the disclosure of which is hereby incorporated by reference.

The microfluidic chip 10 may be formed from glass, silica, quartz, or plastic or any other suitable material.

Fluid is collected from the microchannel 20 through the fluid outlet 18 and may be deposited in any appropriate waste reservoir, such as, for example, a chip as described in the commonly assigned U.S. patent application Ser. No. 11/850,229.

Fluid movement through the circuit is generated and controlled by means of a negative pressure differential applied between the outlet port 18 and one or more of the inlet ports 12, 14, 16. Application of a negative pressure differential between the outlet port 18 and one or more of the inlet ports 12, 14, 16 will cause fluid flow from the inlet port(s), through the microchannel 20 and to the outlet port 18. A pressure differential can be generated by one or more pressure sources, such as negative pressure source 22, which, in one embodiment, may comprise a vacuum pump. In the illustrated embodiment, pressure differentials between the outlet port 18 and the inlet ports 12, 14, 16 is controlled by means of pressure control valves controlling pressure at each of the inlet ports 12, 14, 16 and the outlet port 18.

More specifically, a pressure control valve 30 is arranged in communication with the pressure source 22 and the outlet port 18. Similarly, a pressure control valve 24 is arranged in communication with the inlet port 12, a pressure control valve 26 is arranged in communication with the inlet port 14, and a pressure control valve 28 is arranged in communication with the inlet port 16. Arrangements having more than three inlet ports would preferably have a pressure control valve associated with each inlet port. In the illustrated embodiment of FIG. 1, valves 24, 26, 28 are three-way valves which may selectively connect each associated inlet port 12, 14, 16, respectively, to either atmospheric pressure, represented by the circled letter "A", or an alternative pressure source, which may be the negative pressure source 22. That is, in the illustrated embodiment, valve 24 is in communication pressure source 22 via pressure line 32 and is in communication with inlet port 12 via pressure line 34. Valve 26 is in communication with pressure source 22 via pressure line 36 and is in communication with inlet port 14 via pressure line 38. Valve 28 is in communication with pressure source 22 via pressure line 40 and is in communication with inlet port 16 via pressure line 42. Valve 30 is connected via pressure line 44 to the pressure source 22 and by pressure line 46 to outlet port 18. In the illustrated embodiment, valve 30 is also a three-way valve for selectively connecting the outlet port 18 to either atmospheric pressure, indicated by the circled "A", or to the pressure source 22.

Pressure source 22 and valves 24, 26, 28, 30 may be controlled by a controller 50. Controller 50 is connected via a control line 52 to the pressure source 22, via a control line 54 to the valve 24, via a control line 56 to valve 26, via a control line 58 to valve 28, and via a control line 60 to valve 30. Controller 50 may also be connected to one or more of the various components wirelessly or by other means known to persons of ordinary skill in the art. Controller 50 may comprise a programmed computer or other microprocessor.

As mentioned above, fluid flow from an inlet port 12, 14, and/or 16 through the microchannel 20 and to the outlet port 18 is generated by the application of a negative pressure differential between the outlet port 18 and one or more of the inlet ports. More specifically, to generate a fluid flow from inlet port 12, a negative pressure is applied to the outlet port 18 by connecting the negative pressure source 22 to the outlet port 18 via the control valve 30 and pressure lines 44 and 46. Inlet port 12 is opened to atmospheric pressure by valve 24. This creates the negative pressure differential between the outlet port 18 and the inlet port 12. Assuming that fluid flow from other inlet ports is not desired while fluid is flowing from the inlet port 12, inlet port 14 is closed to atmospheric pressure by valve 26 and inlet port 16 is closed to atmospheric pressure by valve 28. To stop fluid flow from the inlet port 12, valve 24 is activated (e.g., via the controller 50) to close off the inlet port 12 to atmospheric pressure. To rapidly stop the flow of fluid from the inlet port 12, it may be desirable to connect the inlet port 12 to the negative pressure source 22 via the control valve 24 for a period of time sufficient to equalize the pressure between the inlet port 12 and the inlet of the microchannel, and then shut off control valve 24 to maintain this pressure equilibrium.

A predetermined volume of fluid can be introduced into the microchannel 20 from any of the inlet ports 12, 14, and 16—assuming the flow rate generated by the pressure differential between the outlet port 18 and the applicable inlet port is known—by maintaining the pressure differential for a period of time which, for the generated flow rate, will introduce the desired volume of fluid into the microchannel 20. Maintaining the pressure differential can be effected by proper control of the pressure control valves associated with the inlet ports and the outlet port.

Activation and timing of the control valve 24 may be controlled by the controller 50.

To then generate fluid flow from the inlet port 14, valve 26 is activated (e.g., by controller 50) to open inlet port 14 to atmospheric pressure while negative pressure is applied to the outlet port 18, thus creating the negative pressure differential between the outlet port 18 and the inlet port 14. Fluid flow from the inlet port 14 is stopped by activating valve 26 to close inlet port 14 to atmospheric pressure, and, to rapidly stop flow from the inlet port 14, valve 26 opens the inlet port 14 to the negative pressure source 22 for a period of time sufficient to equalize the pressure between the inlet of the microchannel and the inlet port 14, and then shut off valve 26 to maintain this pressure equilibrium.

Similarly, to generate fluid flow from the inlet port 16, valve 28 is activated (e.g., by controller 50) to open inlet port 16 to atmospheric pressure while negative pressure is applied to the outlet port 18, thus creating the negative pressure differential between the outlet port 18 and the inlet port 16. Fluid flow from the inlet port 16 is stopped by activating valve 28 to close inlet port 16 to atmospheric pressure, and, to rapidly stop flow from the inlet port 16, valve 28 opens the inlet port 16 to the negative pressure source 22 for a period of time sufficient to equalize the pressure between the inlet of the microchannel and the inlet port 16, and then shut off valve 28.

Figure 2:
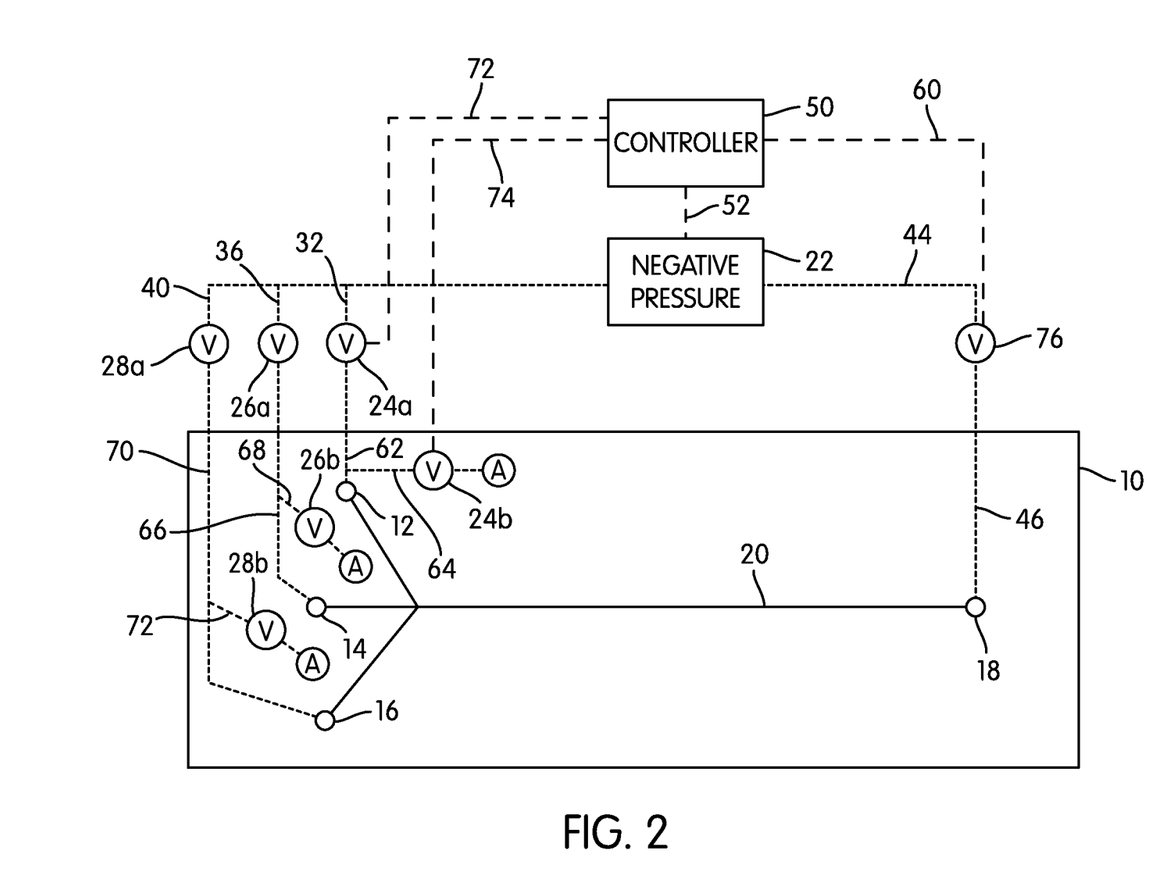
FIG. 2 is a schematic view of an alternative embodiment of a microfluidic chip and flow control system embodying aspects of the present invention.
Figure 3:
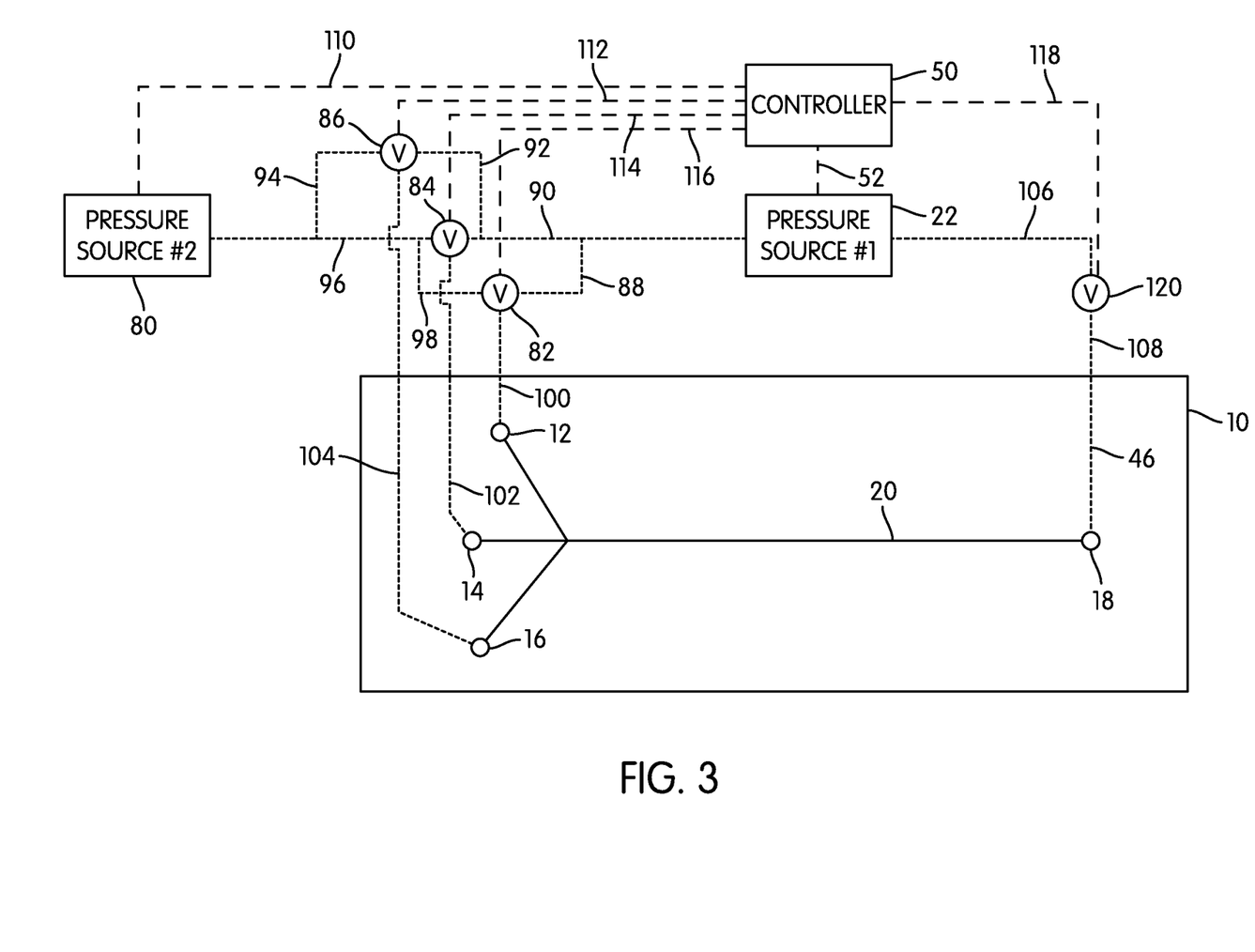
FIG. 3 is a schematic view of a second alternative embodiment of a microfluidic chip and flow control system embodying aspects of the present invention.

FIGS. 2 and 3 show alternative arrangements for controlling the pressure differential between an outlet port and one or more of the inlet ports of a microfluidic circuit. FIG. 2 shows a system similar to that shown in FIG. 1 except that each inlet port 12, 14, 16 is coupled to two two-way valves as opposed to a single three-way valve. More specifically, inlet port 12 is coupled to a first two-way valve 24a for selectively connecting the inlet port 12 to the pressure source 22 via pressure lines 32 and 62. Inlet port 12 is also coupled to a second two-way valve 24b for selectively connecting the inlet port 12 to atmospheric pressure "A" via pressure line 64.

Similarly, inlet port 14 is coupled to a first two-way valve 26a for selectively connecting port 14 to the pressure source 22 via pressure lines 36 and 66 and to a second two-way valve 26b for selectively connecting the inlet port 14 to atmospheric pressure via pressure line 68. Inlet port 16 is coupled to a first two-way valve 28a for selectively connecting the inlet port 16 to the pressure source 22 via pressure lines 40 and 70 and to a second two-way valve 28b for selectively connecting the inlet port 16 to atmospheric pressure via pressure line 72.

In the system shown in FIG. 2, outlet port 18 is coupled to two-way valve 76 for selectively connecting the outlet port 18 to the pressure source 22 via pressure lines 44 and 46.

Controller 50 controls the negative pressure source 22 via control line 52, controls two-way valve 76 via control line 60, controls two-way valve 24a via control line 72, and controls two-way valve 24b via control line 74. Controller 50 is also linked to valves 26a, 26b, 28a, and 28b for controlling those valves, but the control connections between the controller 50 and the respective valves are not shown in FIG. 2 so as to avoid unnecessarily cluttering the Figure.

FIG. 3 shows an alternative arrangement of the system embodying aspects of the present invention. In the embodiment of FIG. 3, each inlet port 12, 14, 16 is coupled to a three-way valve for selectively connecting the port either to pressure source #1 22, or pressure source #2 80. More specifically, inlet port 12 is coupled to valve 82 configured to selectively connect the inlet port 12 to pressure source #1 22 via pressure lines 88, 90, and 100 or to pressure source #2 80 via pressure lines 96, 98, and 100. Inlet port 14 is coupled to valve 84 configured to selectively connect inlet port 14 to the pressure source #1 22 via pressure lines 90 and 102 or to pressure source #2 80 via pressure lines 96 and 102. Inlet port 16 is coupled to pressure valve 86 configured to selectively couple port 16 to pressure source #1 22 via pressure lines 90, 92 and 104 or to pressure source #2 80 via pressure lines 96, 94 and 104. Outlet port 18 is coupled to valve 122 for selectively connecting outlet port 18 to pressure source #1 22 via pressure lines 106 and 46.

Controller 50 controls pressure source #1 22 via control line 52 and controls pressure source #2 80 via control line 110. Controller 50 also controls pressure valve 120 via control line 118, pressure valve 82 via control line 116, pressure valve 84 via control line 114, and pressure valve 86 via control line 112.

To generate fluid flow from inlet port 12, control valve 120 is activated (e.g., by controller 50) to connect outlet port 18 to pressure source #1 22, and control valve 82 is activated to connect inlet port 12 to pressure source #2 80. The pressure generated by pressure source #2 80 is preferably greater than the pressure generated by pressure source #1 22. Thus, a negative pressure differential is created between outlet port 18 and inlet port 12. Inlet ports 14 and 16 are connected, by valves 84 and 86, respectively, to pressure source #1 22 for a period of time to equalize the pressure between the inlet port and the inlet of the microchannel, and then shut off valves 84 and 86 to maintain an established pressure, so there is no pressure differential between inlet ports 14 and 16 and the inlet of the microchannel and thus no fluid flow from inlet ports 14 and 16 to outlet port 18. To stop fluid flow from inlet port 12, control valve 82 is activated to connect inlet port 12 to pressure source #1 22 to equalize the pressure between the outlet port 18 and the inlet port 12 and then shut off control valve 82.

To generate fluid flow from inlet port 14, control valve 84 is activated to connect inlet port 14 to pressure source #2 80 to create a negative pressure differential between outlet port 18 and inlet port 14. Valves 82 and 86 to inlet ports 12 and 16 are closed off, so there is no pressure differential between inlet ports 12 and 16 and inlet of the microchannel and thus no fluid flow from inlet ports 12 and 16 to outlet port 18.

To stop fluid flow from inlet port 14, control valve 84 is activated to connect inlet port 14 to pressure source #1 22 to equalize the pressure between the inlet of the microchannel and the inlet port 14, and then valve 84 is shut off to maintain this pressure equilibrium.

To generate fluid flow from inlet port 16, control valve 86 is activated to connect inlet port 16 to pressure source #2 80 to create a negative pressure differential between outlet port 18 and inlet port 16. Inlet ports 12 and 14 are connected, by valves 82 and 84, respectively, to pressure source #1 22 for a period of time to equalize the pressure between the inlet port and the inlet of the microchannel, and then shut off valves 84 and 86 to maintain an established pressure, so there is no pressure differential between inlet ports 12 and 14 and outlet port 18 and thus no fluid flow from inlet ports 12 and 14 to outlet port 18. To stop fluid flow from inlet port 16, control valve 86 is activated to connect inlet port 16 to pressure source #1 22 to equalize the pressure between the outlet port 18 and the inlet port 16, and then shut off control valve 86.

As an alternative arrangement, three-way valves 82, 84, 86 could each be replaced by two two-way valves for selectively connecting each associated inlet port with pressure source #1 22 or pressure source #2 80.

Suitable valves for use in the present invention include two-way and three-way solenoid valves by IQ Valves Co., Melbourne, Fla. and The Lee Company, Westbrook, Conn.

The systems shown in FIGS. 1, 2 and 3 can be utilized in a process for performing PCR within discreet droplets of assay reagents flowing through a microchannel and separated from one another by droplets of non-reacting fluids, such as buffer solution, as is described in commonly assigned, co-pending U.S. application Ser. No. 11/505,358. The process will be described with reference to FIGS. 4 and 5.

Figure 4:
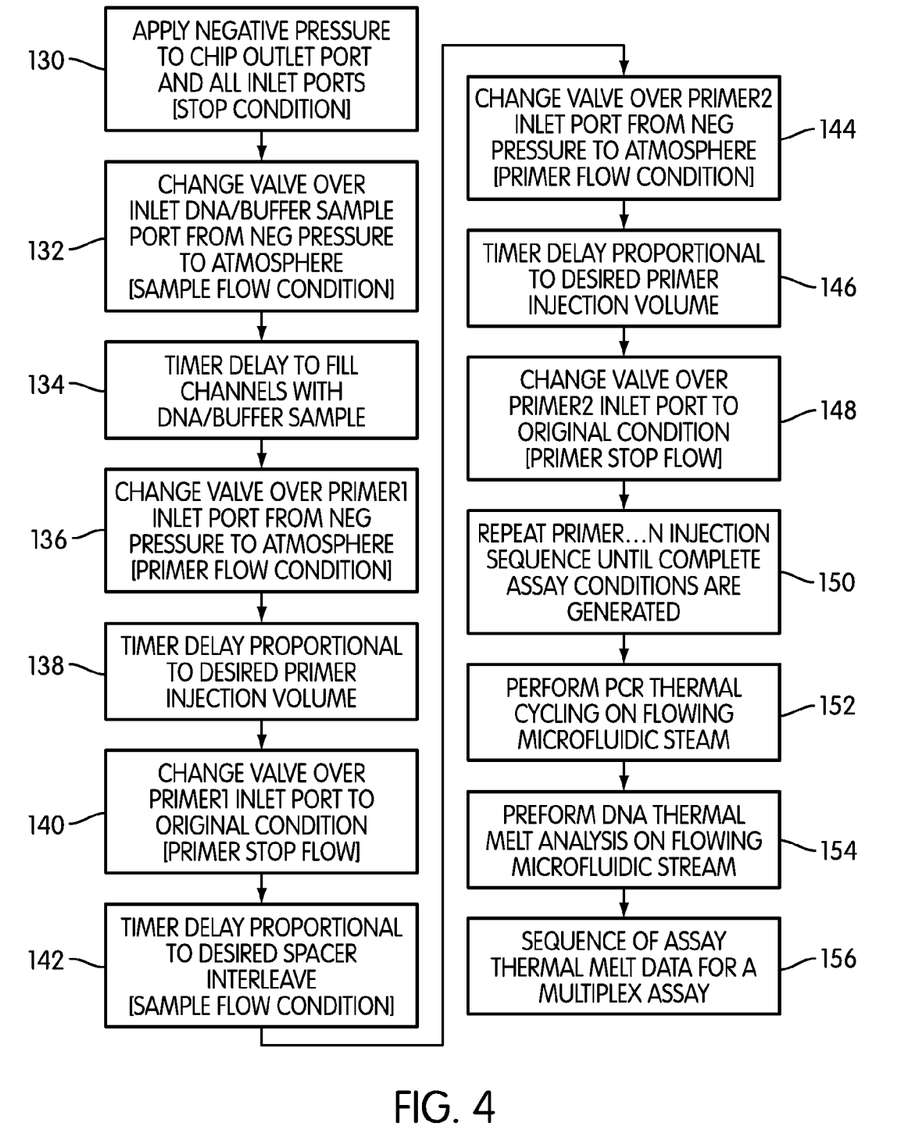
FIG. 4 is a flow chart illustrating steps of performing a sequential, multiplex assay within a micro channel in accordance with aspects of the present invention.
Figure 5:
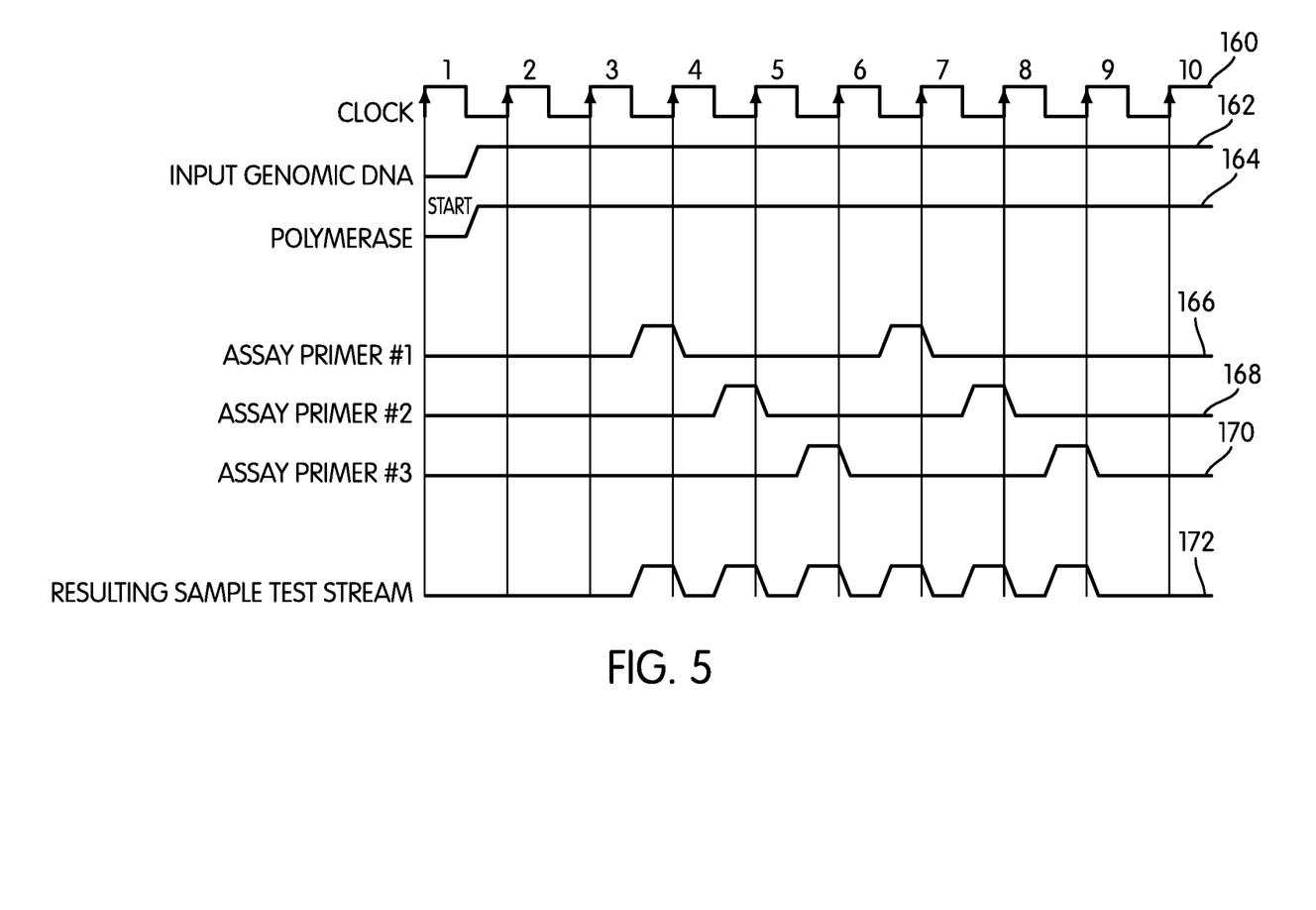
FIG. 5 shows time history profiles of the flows of DNA, polymerase, assay primers, and the resulting sample test stream within a microchannel.

FIG. 4 is a flow chart illustrating the steps for performing PCR within discreet droplets flowing through a microchannel, and FIG. 5 shows time history curves representing the flow of various materials through the channel. The process will be described with reference to the system shown in FIG. 1. It should be understood, however, that the process could also be performed with the systems of FIG. 2 or 3 or a hybrid combination of the systems of FIGS. 1, 2, and 3.

Referring to FIG. 4, at step 130 negative pressure is applied to the outlet port 18 and all of the inlet ports 12, 14, 16, etc, by connecting the ports, via the associated valves, to negative pressure source 22, and by shutting off the valves to inlets 12, 14, and 16. This is known as a stop condition as there is no pressure differential between the waste port and any inlet port, and thus no fluid flow into the microchannel 20.

In step 132, the valve coupled to the DNA/buffer inlet port (e.g., valve 24 associated with inlet port 12) is switched from negative pressure to atmospheric pressure to generate a sample flow condition (i.e., a negative pressure differential between outlet port 18 and inlet port 12) as shown by the curve 162 in FIG. 5. Although not shown in FIG. 4, a valve coupled to a polymerase inlet port may also be switched from negative pressure to atmospheric pressure to generate a polymerase flow as shown by curve 164 in FIG. 5. The DNA/buffer mixture is combined into a common flow through the microchannel 20.

In step 134, a timer delay is implemented to fill the channels with the DNA/buffer (and optionally polymerase) mixture.

In step 136, the valve coupled to a PRIMER1 inlet port (e.g., valve 26 associated with inlet port 14) is switched from negative pressure to atmospheric pressure to generate a primer flow condition into the microchannel 20 to be mixed with the sample flow stream. A timer delay that is proportional to the desired timer injection volume is implemented in step 138 to control the volume of PRIMER1 that flows into the mixture. In step 140, the valve coupled to PRIMER1 inlet port is switched to the original condition, i.e., negative pressure with the valve shutting off, to stop primer flow, thereby generating the first portion of flow curve 166 (through clock interval 4) in FIG. 5.

A timer delay proportional to a desired spacer interleave is implemented in step 142. This is a sample flow condition without primer flowing.

In step 144, the valve coupled to the primer2 inlet port (e.g., valve 28 associated with inlet port 16) is changed from negative pressure with the valve shutting off to atmospheric pressure to generate a primer flow condition into the microchannel 20 to be mixed with the sample flow stream. A timer delay that is proportional to the desired injection volume of primer2 is implemented in step 146. And, in step 148, the valve coupled to the primer2 inlet port is switched back to the original, negative pressure with the valve in the shut off condition to stop the flow of primer2. Steps 144, 146, and 148 generate the flow curve 168 shown in FIG. 5.

In step 150, a primer injection sequence is repeated for additional primers and additional, discrete injections of previously-injected primers until the complete assay conditions are generated, thus generating flow curve 170. The resulting sample test stream flow curve is designated by curve 172 in FIG. 5 in which each "hump" in the curve represents a discrete volume of a primer mixed in the sample flow stream. A separate PCR (or other) assay can be performed in each discrete volume (or bolus) of sample/primer mixture.

In step 152, PCR thermal cycling is performed on the flowing microfluidic stream thereby generating a PCR amplification reaction within each test bolus. In step 154, a DNA thermal melt analysis is performed on the flowing microfluidic stream. And, in step 156, a sequence of assay thermal melt data is generated for each test bolus for a multiplex assay performed within the microchannel 20.

Figure 6:
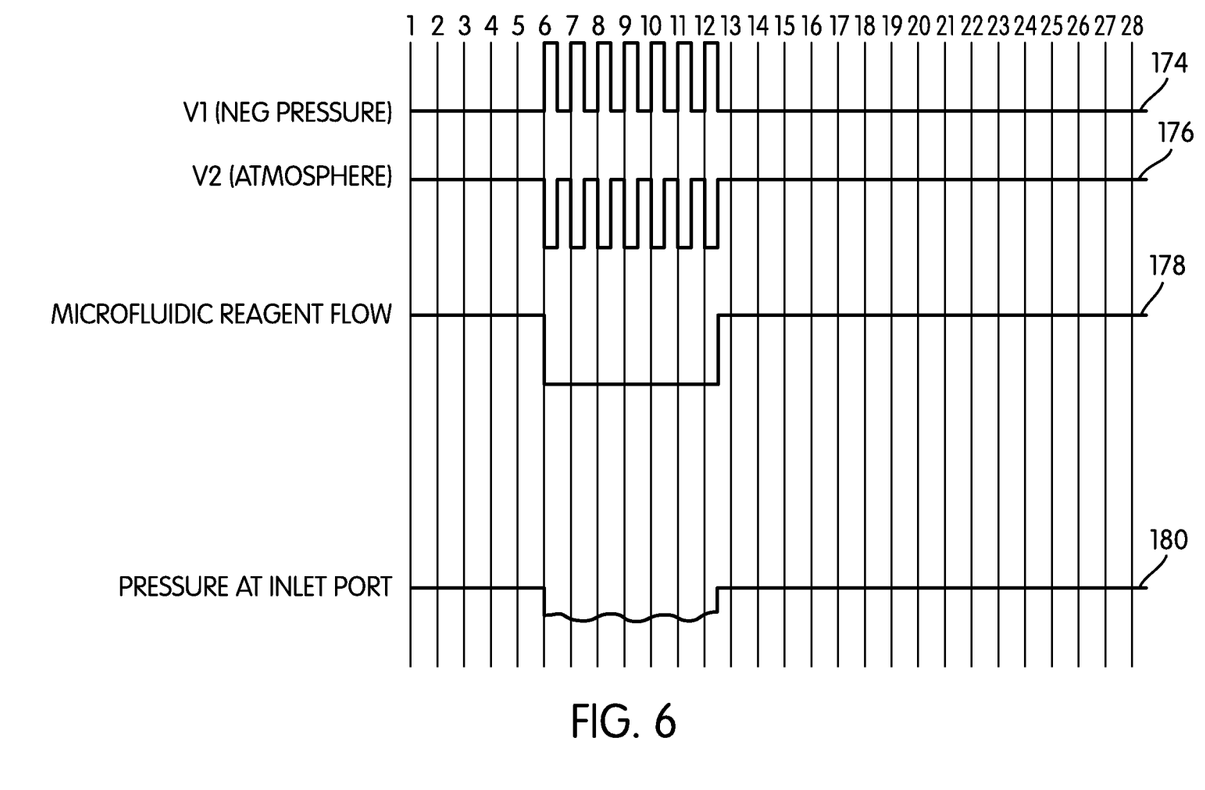
FIG. 6 shows time history profiles of intermittent application of negative pressure and atmospheric pressure to a fluid input well of a microfluidic chip to achieve flow metering.

As shown in FIG. 6, any valve coupled to an inlet port can be operated in a pulse width modulated manner to regulate the volume of fluid injected at the inlet port. For example, as described above, a valve coupled to an inlet port can be set to a flow condition for a predetermined period of time corresponding to a desired volume of fluid to be injected into the microchannel. A smaller volume of fluid can be injected by having the valve coupled to the inlet port set to the flow condition for a shorter period of time. It may be desirable, however, to produce reaction droplets of a specified physical size and, thus, it may be desirable to have fluid flow from the inlet port for the specified period of time (and not the shorter time corresponding to the smaller volume). To produce a lower volume of fluid flow from an inlet port while maintaining the flow from the port for a specified period of time, the valve coupled to the port may be modulated between negative pressure and atmospheric pressure (or other higher pressure) over the desired flow period, as shown in curves 174 and 176 in FIG. 6. The resulting pressure at the inlet port is indicated by curve 180 in FIG. 6. The resulting reagent flow, as shown in curve 178 in FIG. 6, is a generally constant flow over the entire flow period at a flow rate that will result in a lower volume of fluid injected than if the inlet valve were kept open to atmospheric pressure for the entire flow period.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

We claim:

1. A system for sequentially introducing predetermined amounts of different reaction fluids into a microfluidic circuit comprising:
   a. a microfluidic circuit comprising a microchannel, a plurality of inlet ports in fluid communication with the microchannel and through which different reaction fluids are introduced into the microchannel and an outlet port in fluid communication with the microchannel through which fluid from the microchannel is collected;
   b. at least one pressure source in selective communication with said outlet port and said plurality of inlet ports; and
   c. at least one valve mechanism operatively associated with said plurality of inlet ports and in communication with said pressure source, each valve mechanism being adapted to sequentially connect each of said plurality of inlet ports to a pressure generated by said pressure source for a predetermined period of time, causing a predetermined amount of fluid to flow from the inlet port into the microchannel, and then connecting said inlet port to a different pressure to substantially stop the flow of fluid.

2. The system of claim 1 wherein, said at least one pressure source comprises a vacuum pump, said first pressure is a negative pressure generated by said vacuum pump, and said second pressure comprises atmospheric pressure.

3. The system of claim 1, wherein said at least one pressure source comprises a first pump for generating said first pressure and a second pump for generating said second pressure.

4. The system of claim 1, further comprising a controller adapted to control the operation of said pressure source and said valve mechanism and to cause:
   (i) said pressure source to apply said first pressure to said outlet port and to
   (ii) cause said valve mechanism to open one of said plurality of inlet ports to said second pressure to cause fluid to flow from said inlet port into said microchannel and,
   (iii) after said inlet port has been open to said second pressure for a pre-determined period of time, to cause said valve mechanism to close said inlet port to said second pressure and open said inlet port to said first pressure for a predetermined period of time and to shut off the valve mechanism to said inlet port to stop flow from said inlet port into said microchannel;
   wherein said controller causes (ii) and (iii) to repeat for each of said plurality of inlet ports.

5. The system of claim 1, wherein said valve mechanism comprises a three-way valve adapted to selectively communicate each of said plurality of inlet ports with either said second pressure or said first pressure.

6. The system of claim 1, wherein said valve mechanism comprises a first two-way valve constructed and arranged to selectively open each of said plurality of inlet ports to said second pressure or close said inlet port to said second pressure and a second two-way valve constructed and arranged to selectively open said inlet port to said first pressure or close said inlet port to said first pressure.

7. The system of claim 1, wherein said pressure source comprises a single vacuum pump in selective communication with both said outlet port and said valve mechanism.

8. The system of claim 7, further comprising an outlet valve mechanism operatively associated with said outlet port and adapted to selectively connect said outlet port to said pressure source.

9. The system of claim 1, wherein said microfluidic circuit comprises a chip made from glass, silica, quartz, or plastic.

10. The system of claim 1, wherein said valve mechanism comprises a solenoid valve.

* * * * *